H. Knowles,
Cutter Head,
Nº 12,134. Patented Jan. 2, 1855.
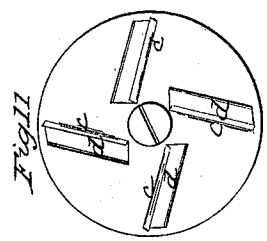
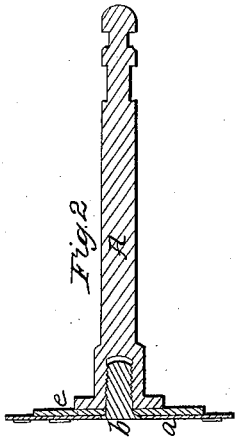
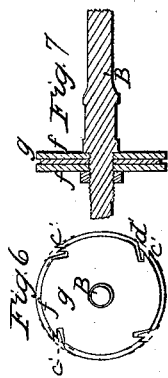
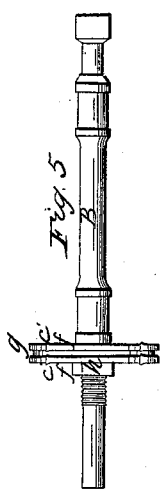
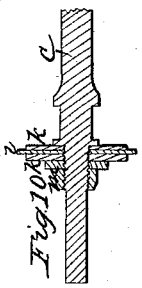
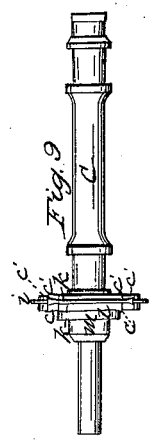
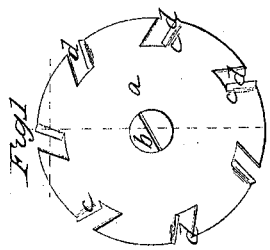
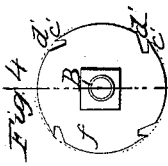

UNITED STATES PATENT OFFICE.

HAZARD KNOWLES, OF NEW YORK, N. Y.

CUTTER FOR TONGUING AND GROOVING.

Specification of Letters Patent No. 12,134, dated January 2, 1855.

*To all whom it may concern:*

Be it known that I, HAZARD KNOWLES, of the city, county, and State of New York, have invented sundry new and useful Improvements in Cutters for Planing, Tonguing, and Grooving Boards, &c.; and I do hereby declare that the following is a full and exact description thereof, reference being had to the accompanying drawings, making a part of this specification, Figures 1, 2, 3, and 11 representing my improved planing disk, Figs. 4, 5, 6, and 7 representing my improved tonguing cutter, and Figs. 8, 9, and 10 representing my improved grooving cutter.

Similar letters indicate like parts in all the figures.

My improved planing disk, is composed of a circular saw plate $a$, having oblique notches $d$, $d$, cut into it, and cutters $c$, $c$, formed upon it by turning up the rear edges of the said notches $d$, $d$, and sharpening them, and then securing said disk to the end of a shaft A, in a firm and substantial manner.

Fig. 2, represents the manner in which I usually secure the cutting disk to its shaft A, viz: by enlarging the end of the shaft, by means of a radiating flange, then placing a stiffening disk $e$, between the cutting disk and the end of the shaft, and then securing the two disks to the end of the shaft by means of a large broad headed tap screw, whose head is countersunk into the cutting disk.

Fig. 11, represents a cutting disk of the form which I make for cutting up fruit and vegetables into slices. As the cutting edges $c$, $c$, wear away, more of the steel disk $a$, is turned up, until it is worn out. I apply this same principle, in the formation of cutters, in forming the cutters for tonguing and grooving purposes. I make them each of three disks of steel of suitable diameters, united to each other upon arbors; their cutting edges being formed by cutting oblique notches $d'$, $d'$, in their peripheries, and throwing outward the angles $c'$, $c'$, at the rear sides of the mouths of said notches, and sharpening the same. As the cutting edges wear away, the rear sides of the notches $d'$, $d'$, are filed away a sufficient amount to form proper shaped points, which are aagin thrown outward a proper distance from the peripheries of the disks.

Consequently, it will be perceived that the cutting disks are not reduced in diameters by renewing their cutting edges, and that no time will be consumed in adjusting these cutting disks. For the reason that when the cutting edges, on the respective disks, have been put in order, all that is necessary is simply to secure them upon their arbors, and they are in exactly the proper position for the perfect performance of their duty.

The tonguing cutters, are formed of the disks $f$, $f$, and $g$. Fig. 4, is a side view of one of the disks $f$; Fig. 5, an edge view of the three disks $f$, $f$, and $g$, placed upon their arbor B; Fig. 6, a side view of the cutting disks $f$, and $g$,—the other disk $f$, being removed; and Fig. 7, a section of the cutting disks and the arbor to which they are secured. The grooving cutters are formed of the central disk $i$, and the side disks $k$, $k$, united to each other and to the arbor C, as represented, in the side view, Fig. 8, the edge view, Fig. 9, and the sectional view, Fig. 10.

It will be perceived that one most valuable feature of the tonguing and grooving cutter heads, is, that their diameter is not reduced by the wearing away of their cutting edges $c'$, $c'$, and the forming of new ones; which is not the case with any other circular cutting instrument.

The cutting edges $c'$, $c'$, for tonguing and grooving, may be widened in upsetting them, a sufficient amount to prevent the disks from heating. They must also be so proportioned and adjusted, that the tongues and grooves formed by them, will correspond with each other.

My improved disk cutter head, and my improved cutter heads for forming tongues and grooves, may be arranged in a machine, in any well known or usual manner.

What I claim as my invention and desire to secure by Letters Patent is—

Forming tonguing and grooving cutter heads, of combined disks of steel, which have cutting edges formed on their peripheries of such a shape that new cutting edges can be formed upon them, as the old wear away, without reducing their diameters, substantially as herein set forth.

HAZARD KNOWLES.

Witnesses:
Z. C. ROBBINS,
GEO. A. C. SMITH.